Feb. 22, 1966 W. A. BARDEN ETAL 3,237,140
VARIABLE RESISTANCE CONTROL
Filed May 20, 1963 2 Sheets-Sheet 1
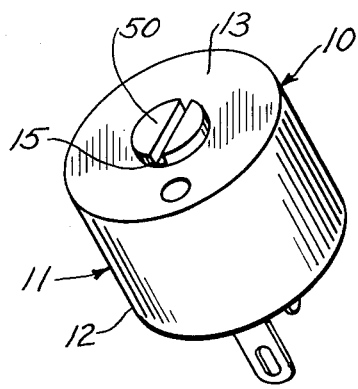
FIGURE 1.
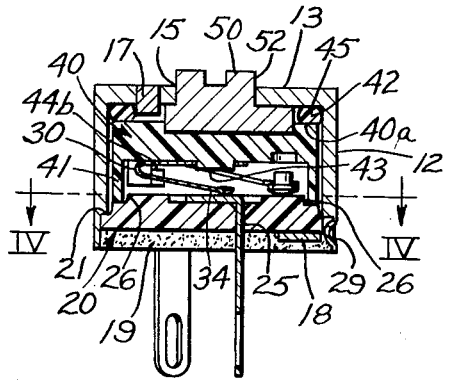
FIGURE 2.
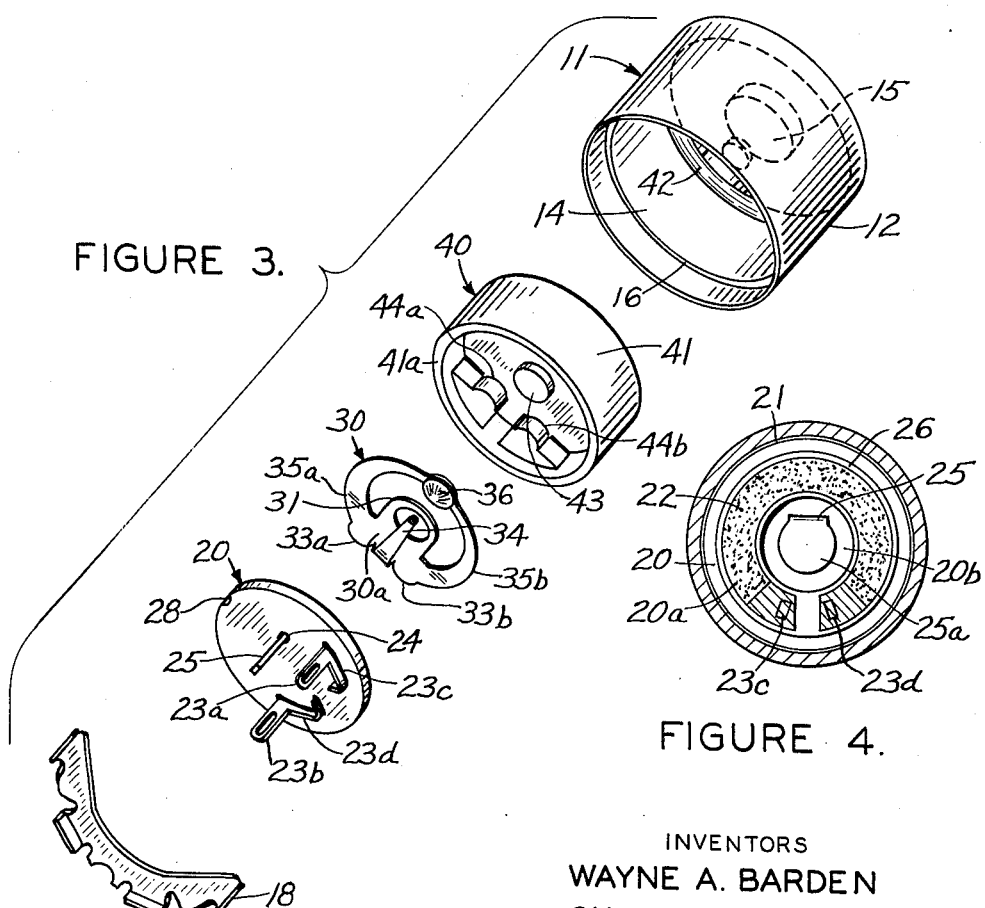
FIGURE 3.
FIGURE 4.
INVENTORS
WAYNE A. BARDEN
CHARLES C. SNYDER
BY John J. Gaydos
ATTORNEY Feb. 22, 1966    W. A. BARDEN ETAL    3,237,140
VARIABLE RESISTANCE CONTROL
Filed May 20, 1963    2 Sheets-Sheet 2

INVENTORS
WAYNE A. BARDEN
CHARLES C. SNYDER
BY John J. Gaydos
ATTORNEY

United States Patent Office 3,237,140
Patented Feb. 22, 1966

3,237,140
VARIABLE RESISTANCE CONTROL
Wayne A. Barden, Elkhart, and Charles C. Snyder, Osceola, Ind., assignors to CTS Corporation, Elkhart, Ind., a corporation of Indiana
Filed May 20, 1963, Ser. No. 281,605
13 Claims. (Cl. 338—164)

The present invention relates to variable resistance controls and, more particularly, to a variable resistance control having a rotatable contact assembly.

In recent years, there has been a tremendous increase in the demand for miniature variable resistance controls. By decreasing the size of the variable resistance control, other characteristics of the control, e.g., rotational torque, are also affected and generally decrease, thus increasing the possibility that the control will not maintain the same resistance setting under normal operating conditions. Initial rotational torque generally is defined as the minimum tangential force necessary to overcome static friction for rotating the shaft of the control from one resistance setting to another. Usually running torque is less than the initial rotational torque. It would be desirable, therefore, to provide a miniature variable resistance control considerably smaller than the controls heretofore available with a high rotational torque to alter the ohmic resistance thereof.

Generally, variable resistance controls are provided with a driver having a shaft molded thereto or fixedly secured thereto in a suitable manner. For economy reasons, it is desirable to mold the shaft to the driver but, in a miniature variable resistance control, the diameter of the shaft must not be reduced beyond a specific minimum dimension, otherwise the shaft probably will be sheared from the driver upon rotation of the shaft. In the past, metal shafts have been employed with variable resistance controls, however, by reducing the size of the control, difficulties regarding clearance and the strength of the connection are amplified when the shaft is fixedly secured to the driver. Clearance becomes a problem when additional space must be provided in the housing to prevent the means, e.g., tabs, securing the shaft to the driver from contacting other components in the housing or the inner surface of the housing. Since the same rotational force will be applied to the shaft regardless of the reduction in size of the control, the strength of the means securing the shaft to the driver cannot be decreased. It would be desirable, therefore, to provide a variable resistance control with a metal shaft secured to the driver in such a manner that the above mentioned problems are eliminated.

As typical of the majority of variable resistance controls, it is preferable that a stop means be employed with the control to limit rotation of the control shaft to an angle less than 360°. With a large resistance control, a structurally sound stop means may be provided in various locations inside or outside of the housing, however, as the size of the control decreases, proportional stop means become structurally weak especially if the stop means is connected to the driver, and it becomes necessary that an enlarged stop means be employed to assure that the stop means will not be sheared off when the control shaft is rotated thereagainst. It would, therefore, also be preferable to provide a miniature variable resistance control employing stop means having the same structural strength as found in larger control units.

The mounting location of the variable resistance control unit determines the type of shaft necessary for operating the control. It would, therefore, be preferable to provide a variable resistance control with means for assemblying the shaft in a simple and facile manner.

Accordingly, it is an object of the present invention to provide a new and improved variable resistance control having the various desirable features set forth above.

Another object of the present invention is to provide a miniature variable resistance control having a high rotational torque in proportion to the size thereof.

Still another object of the present invention is to provide a variable resistance control with various types shafts.

A further object of the present invention is to provide a variable resistance control with improved stop means.

A still further object of the present invention is to provide a variable resistance control with a driver having a cavity for enclosing the contact assembly.

Further objects and advantages of the present invention will become apparent as the following description proceeds, and the features of novelty which characterize the invention will be pointed out with particularity in the claims annexed to and forming a part of this specification.

Briefly, the variable resistance control comprises a supporting member of insulating material having an arcuate resistance film disposed on the top surface thereof. A molded cup-shaped driver having a contact assembly mounted within the cavity of the driver for rotation therewith is supported on the supporting member. The supporting member and the driver containing the contact assembly are enclosed in a housing, and rotatable means engageable from the exterior of the housing is employed for altering the angular position of the driver and the contact assembly with respect to the supporting member. As the driver is rotated, a contact button secured to the contact assembly wipes the resistance film at any desired point intermediate the ends thereof. By engaging the peripheral lip of the cup-shaped driver against the supporting member, sufficient friction is obtained therebetween. Thus the resistance setting will not change due to centrifugal forces and the like, and the employment of sufficient rotational torque is necessary to overcome and alter the wiping position of the contact button on the resistance film. Terminals are electrically connected to the ends of the arcuate resistance film and to a collector button encircled by the resistance film for electrically connecting the variable resistance control into a circuit. The driver is provided with a simple means for assemblying any one of several shafts thereto for rotating the driver from the exterior of the housing. The shaft is secured to the driver in such a manner that no portion thereof projects into the cavity of the driver containing the contact assembly. Any one of the several shafts is provided with a lateral extension, i.e., a stop member, for engaging an inwardly extending projection such as a stop pin in the housing to limit the angular rotation of the driver.

For a better understanding of the present invention, reference may be had to the accompanying drawings wherein the same reference numerals have been applied to like parts and wherein:

FIGURE 1 is an isometric view of a variable resistance control;

FIGURE 2 is a sectional view of the variable resistance control of FIGURE 1;

FIGURE 3 is an exploded view of the variable resistance control of FIGURE 1;

FIGURE 4 is a sectional view of the control taken along line IV—IV of FIGURE 2 assuming the control is shown in full;

Figure 5:
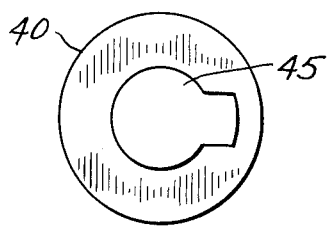
FIGURE 5 is a top plan view of a driver of the control.

Referring now to the drawings, there is illustrated a variable resistance control, generally indicated at 10, comprising a housing 11. Mounted inside of the housing 11 are a supporting member 20, a contact assembly 30, and a driver 40 rotatably supported on the supporting member or base 20. For the purpose of rotating the driver 40, a shaft 50 operatively connected to the driver is engageable from the exterior of the housing.

Considering first the housing 11, it specifically comprises a hollow cylindrical member 12 having a centrally apertured closure wall 13 at one end thereof and open at the other end 14 thereof. Although the closure wall 13 is preferably an integral part of the housing 11, it is to be understood that the closure wall 13 may be integrally or detachably secured in a suitable manner to the hollow cylindrical member 12. The housing 11 is mounted on the supporting member 20 and is fixedly secured thereto in a suitable manner. Extending through an aperture 15 of the closure wall 13 of the housing 11 is the shaft 50 rotatable externally of the housing and operatively connected to the driver 40 supported in the housing on the supporting member 20.

As best seen in FIGURES 2 and 4 of the drawings, the supporting member 20 is provided with a circumferentially extending groove or shoulder 21 for supporting the housing 11. In the preferred form of the invention, the housing 11 is provided with a complementary circumferentially extending shoulder 16 (see FIGURE 3) engaging the groove 21 and thereby locating the supporting member 20 with respect to the inner surface of the closure wall 13 of the housing 11.

As typical of most variable resistance controls of the rotatable type, the top surface 20a (see FIGURE 4) of the supporting member 20 is provided with an arcuate resistance film 22 of carbon or cement composition. After the arcuate resistance film 22 has been suitably secured or bonded to the top surface 20a of the supporting member 20 in a manner well known in the art, a pair of terminals 23a and 23b are secured to the supporting surface 20 with a suitable high temperature nonconductive epoxy cement. The end of each of the terminals 23a and 23b engaging the bottom surface of the supporting member 20 is provided with a lateral extension 23c and 23d respectively, each of the lateral extensions having an upended portion projecting through the supporting member 20 and communicating with the top surface 20a thereof as best seen in FIGURE 4 of the drawings. When the terminals 23a and 23b have been firmly secured to the base, a conductive film such as silver paint or other suitable conductive material is applied onto the top surface 20a of the supporting member 20 adjacent to the upended portions of the lateral extensions 23c and 23d to connect electrically the upended portion of each of the terminals to the ends of the arcuate resistance film 22.

In order to provide means for electrically connecting any point intermediate the ends of the resistance film 22 externally of the control 10, the supporting member 20 is provided with a slot 24 for receiving a center terminal 25, the terminal 25 also being bonded to the supporting member by a suitable high temperature nonconductive epoxy cement. A collector button 25a normal to the inner end of the terminal 25 and integrally connected thereto is electrically connected by means of a contact assembly 30 to any point intermediate the ends of the resistance film 22. Preferably, the top surface 20a of the supporting member 20, is provided with a recess 20b, the depth of the recess being substantially equal to the thickness of the collector button 25a, so as to position the top surface thereof substantially in the same plane as the resistance film 22. Moreover, by disposing the button 25a in the recess 20b of the supporting member, the overall height of the variable resistance control 10 may be kept at a minimum.

In accord with the present invention, the supporting member 20 is provided with another circumferentially extending shoulder 26 disposed inwardly of the circumferentially extending shoulder 21 for supporting one end of the driver 40 in the housing 11. As best seen in FIGURES 2 and 4 of the drawings, the shoulders 21 and 26 of the supporting member 20 provide circular peripheral tiers along the outer edge thereof. The driver 40 of molded construction is provided with a depending flange 41, the peripheral lip 41a thereof circumposing the shoulder 26 of the supporting member 20. It will be appreciated that, in operation, the force exerted by the driver 40 against the supporting member 20 and the coefficient of friction determine the amount of torque necessary to rotate the driver with respect to the supporting member for altering the resistance setting of the control. For biasing the driver against the supporting member 20, a thrust washer 42 disposed inside of the housing between the top surface 40a of the driver 20 and the inner surface of the closure wall is employed. The thrust washer 42 also effectively seals the upper portion of the housing 11 and prevents moisture and the like from entering the lower inner portion of the housing. By altering the thickness of the thrust washer 42, the force exerted by the driver 40 against the supporting member may be varied.

As best seen in FIGURE 3 of the drawings, the driver 40 is provided with a downwardly extending post or boss 43 centrally located in the bottom wall of the driver 40 for supporting and centering the contact assembly 30. More specifically, the contact assembly 30 is provided with an apertured inwardly extending tongue 31, the downwardly extending boss 43 of the driver 40 being inserted in the aperture of the tongue 31 for centering the contact assembly 30. In order to assure that the contact assembly 30 is properly mounted in the driver and rotatable therewith, the inner portion of the driver 40 is provided with a pair of spaced slots 44a and 44b for receiving a pair of outwardly extending tabs 33a and 33b respectively of the contact assembly. Each of the slots is disposed between an abutment projecting inwardly of the depending flange 41 and the surface of the bottom wall of the driver 40. By mounting the outwardly extending tabs 33a and 33b of the contact assembly 30 in the slots 44a and 44b and the apertured inwardly extending tongue 31 over the downward extending post 43, the contact assembly is properly centered in the driver and rotatable therewith. The post 43 centers the contact assembly 40 and the outwardly extending tabs 33a and 33b fixedly secured in the slots constrain the contact assembly 32 to rotate with the driver. The slots 44a and 44b may be provided in the depending flange 41 of the driver. It is, however, preferable to reinforce the area adjacent to the slots with suitable abutments and cement the tabs 33a and 33b in the slots 44a and 44b.

For the purpose of electrically connecting any point intermediate the ends of the arcuate resistance film 22 to the contact button 25a integrally secured to the center terminal 25, the contact assembly 30 is provided with a reversely bent or turned-in finger 34 extending from the base 30a thereof, the tip thereof contacting the collector button 25a (see FIGURE 2 of the drawings). The flexibility of the finger 34 is increased by connecting it at a point most remote from the center of the contact assembly 30. A pair of bifurcated arcuate arms 35a and 35b extending from the base 30a of the contact assembly toward the side diametrically opposite the base join to support a carbon contact button 36 arranged in the housing so as to wipe or ride over the arcuate resistance film 22 as the driver is rotated through a predetermined angle.

According to the present invention, the contact assembly 30, the arcuate resistance film 22, and the contact button 25a of the center terminal 25 are enclosed within the area defined by the downwardly extending flange 41 of the driver 40 and the top surface of the supporting member 20, and, as explained above, the friction between the peripheral lip 41a of the flange 41 of the driver 40 and the supporting member 20 prevents the driver from being inadvertently rotated by centrifugal force or the like with respect to the supporting member 20. It is to be understood that a portion of the driver can frictionally engage the inner wall of the cylindrical member 12.

In the illustrated arrangement, means must be provided for rotating the driver externally of the housing. Obviously, a suitable tool, e.g., a screwdriver, can be inserted into the aperture 15 of the housing 11 for operatively engaging the top surface of the driver 40. Under such conditions, however, additional means would be necessary for rotatably supporting the end of the driver most remote from the supporting member 20. By providing the top surface of the driver 40 with a noncircular cavity 45 (see FIGURE 5 of the drawings) and by providing the end of the shaft 50 with a configuration complementary to the cavity 45, i.e., a noncircular member, the circular portion 52 of the shaft journaled in the aperture 15 of the closure wall 13 of the housing also rotatably supports the driver 40. Moreover, the end of the shaft 50 can be inserted into the cavity 45 of the driver 40 in a simple and facile manner. When the control 10 is provided with a short shaft 50, a slot 51 is inserted in the end thereof. Accordingly, the shaft 50 transfers the rotational torque applied from the exterior of the housing to the driver 40 interior of the housing and, at the same time, rotatably supports one end of the driver in the housing. By detachably securing the shaft 50 to the driver in accord with the present invention, it is possible to assemble quickly variable resistance controls with various types of external shafts and prevent foreign matter, e.g., burrs and the like, from entering the cavity of the driver enclosing the contact assembly and the resistance element.

Figure 6:
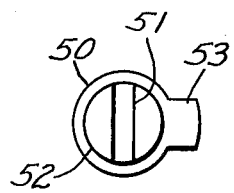
FIGURE 6 is a top plan view of a shaft of the control.
Figure 7:
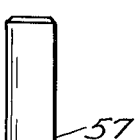
FIGURE 7 is a side elevational view of the shaft of FIGURE 6.

When operating the variable resistance control 10, it is preferable that some means be employed to limit the angular rotation of the driver 40 and the contact assembly 30 mounted thereto. Otherwise, the carbon button 36 will show rapid wear when wiped over the terminal ends of the resistance element. In the preferred form of the invention, the housing 11 is provided with a stop means, e.g., a downwardly extending projection such as a stop pin 17 (see FIGURE 2) for limiting the rotation of the driver 40. As the shaft 50 is rotated, a stop member 53, as best seen in FIGURE 6 of the drawings, engages the stop pin 17 and prevents further rotation of the shaft 50 and the driver 40. Since the shaft 50 is of a hard material, for example, steel, and the stop member 53 is an integral part thereof, inadvertent excessive force will not shear the stop member 53 from the shaft 50 or the stop pin 17 from the housing 11. Moreover, since the stop member 53 is integrally connected to the shaft, the strength of the connection between the shaft and the driver is immaterial. A notch 28 (see FIGURE 3) provided in the supporting member 20 engages an inwardly extending detent 29 in the housing for orientating the member 20 with the stop pin 17. Thus the stop pin 17 always halts the angular rotation of the driver 40 when the carbon button 36 of the contact assembly 30 reaches the end of arcuate resistance film 22.

In order to maintain the supporting member 20 fixedly secured against the shoulder 16 of the housing 11, a ground plate 18 as seen in FIGURES 2 and 3 of the drawings is disposed against a portion of the bottom surface of the supporting member and the contiguous portion of the cylindrical member 12 of the housing, e.g., by welding the ground plate 18 to the housing. If it is desirable to seal the unit, a nonconductive epoxy cement 19 is poured into the cavity defined by the bottom surface of the supporting member 20 and the lower portion of the inner wall of the cylindrical member 12. In some applications, it is preferable to ground the housing to various circuit components or the like. Consequently, one or more not shown depending terminals are provided with the ground plate 18.

Figure 8:
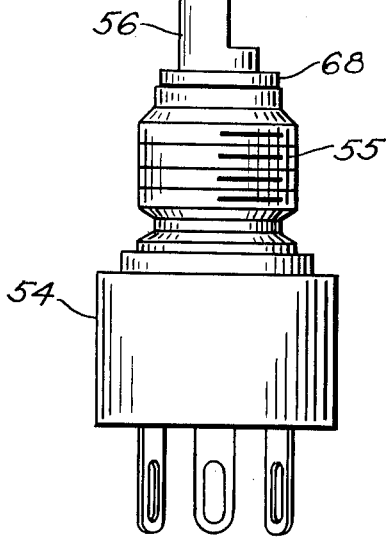
FIGURE 8 is a front elevational view of another embodiment of a variable resistance control.
Figure 9:
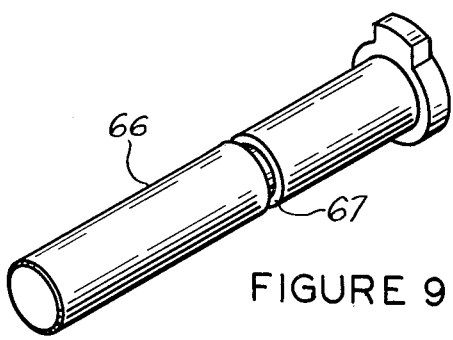
FIGURE 9 is an isometric view of the shaft of a control.

The embodiment seen in FIGURE 8 of the drawings is substantially the same as the embodiment of FIGURE 1, the main difference being that the housing 54 is provided with a threaded portion 55, and a shaft 56 is provided with a substantial external length for supporting a not shown control knob or the like. The internal construction of the variable resistance control seen in FIGURE 8 is identical to that seen in FIGURES 2–5 of the drawings. The shaft 56 can be provided with a flat surface 57 or the shaft may be cylindrical as shown in FIGURE 9 of the drawings. When a long shaft 66 is employed with the housing 54, the shaft 66 preferably is provided with a circumferential groove 67 for receiving a C-washer 68 in order to restrict movement of the shaft and prevent damage to the supporting member 20 and the driver 40 if an excessive axial force is applied to the shaft.

The operation of the present invention will readily be understood, in view of the detailed description included above, and no further discussion is included herewith. It will be appreciated that the terminals 23a and 23b may be of wire or suitable material for electrically connecting the variable resistance control 10 into the circuit.

While there has been illustrated and described what is at present considered to be a preferred embodiment of the present invention and a single modification thereof, it will be appreciated that numerous changes and modifications are likely to occur to those skilled in the art, and it is intended in the appended claims to cover all those changes and modifications which fall within the true spirit and scope of the present invention.

The invention claimed is:

1. A variable resistance control comprising a hollow cylindrical housing having a centrally apertured closure wall at one end thereof and open at the other end thereof, a driver disposed in the housing having a flange spaced from the inner surface of the cylindrical housing, a supporting member closing the open end of the cylindrical housing, the inner surface of the supporting member frictionally engaging a peripheral lip of the flange of the driver, a resistance element disposed on the supporting member, a contact assembly secured within the flange of the driver and disposed above the supporting member, the contact assembly being provided with a contact button adapted for wiping the resistance element at any desired point intermediate the ends thereof, means extending through the aperture of the closure wall and rotatable from the exterior of the housing for altering the relative position between the contactor and the resistance element, and means for connecting the control to an electrical circuit.

2. In a variable resistance control, the combination of a housing having a centrally apertured closure wall with a downwardly directed peripheral flange to define a cover open at the bottom, a supporting member closing the bottom of the housing, means for securing the member to the housing, a molded cup-shaped driver enclosed in the housing, a peripheral lip of the cup-shaped driver slideably engaging the supporting member, a contact assembly disposed within the cup-shaped driver, a resistance element mounted onto a surface of the supporting member, said contact assembly including a contact adapted for wiping the resistance element at any desired point intermediate the ends thereof, and means extending through the apertured closure wall of the housing and operatively connected to the driver for rotating the driver and the contact mounted therein.

3. In variable resistance unit, the combination of a housing having a depending flange and open at the bottom, a base closing the bottom of the housing, a resistance film bonded to a surface of the base, a cup-shaped driver rotatably supported on the base, a peripheral lip extending from the cup-shaped driver slideably engaging the base, means electrically connecting the resistance film to the exterior of the housing, a contact assembly fixedly secured to the cup-shaped driver and a rotatable means extending through an aperture in the housing and engageable with means provided in the bottom wall of the cup-shaped driver whereby rotation of the rotatable means wipes a contact button of the contact assembly across the resistance film intermediate the ends thereof.

4. An electrical control comprising, a hollow cylindrical housing having a closed end and an open end, the closed end being provided with an aperture, a base mounted in the open end of the cylindrical housing, a cup-shaped driver rotatably supported on the base, a resistance element fixedly mounted to the base, a contact assembly mounted in the cup-shaped driver and including a contact button adapted for wiping the resistance element at any desired point intermediate the ends thereof, and a shaft extending through the aperture of the housing for rotating the driver, a noncircular member attached to the shaft, the top surface of said cup-shaped driver being provided with a noncircular cavity having disposed therein the noncircular member attached to the shaft, the other end of the shaft extending through the aperture in the cylindrical housing whereby rotation of the shaft alters the position of the driver and the position of the contact button on the resistance element.

5. A contact assembly for a variable resistance control having a driver, a collector button, and a resistance element, the contact assembly comprising a base, a tongue extending from the base and provided with an opening for centering the contact assembly on the driver of the control, a pair of spaced tabs depending from the base for fixedly securing the angular position of the contact assembly with respect to the driver, a reversely bent finger connected to the base for engaging the collector button of the variable resistance control, and a pair of bifurcated arcuate arms extending from the base to a point diametrically opposite the base, the distal ends of the arcuate arms being joined to each other to provide means for supporting a carbon contact button, the carbon contact button being adapted to wipe the resisance element disposed in the control.

6. A driver for a variable resistance control having a supporting member, a resistance element carried by the supporting member, a contact assembly provided with a pair of tabs and engaging the resistance element, and a shaft, the driver comprising a circular member having a top surface and a bottom surface, the top surface of the circular member being provided with a cavity for receiving the distal end of the shaft, a boss secured to the bottom surface for centering the contact assembly of the control, and a circular flange integrally secured to the circular member and having a peripheral lip in frictional engagement with the supporting member of the control, the flange being provided with a pair of spaced slots for receiving the pair of tabs of the contact assembly to register the assembly with the driver.

7. In a variable resistance unit, the combination of a base having a circumferentially extending shoulder, a resistance element disposed on said base, a cup-shaped driver having a downwardly directed flange, the lip portion thereof being in frictional engagement with the circumferentially extending shoulder on the base, a contact assembly mounted in the cavity of the driver for electrically wiping a button across the resistance element, a hollow cylindrical housing enclosing the driver and supported on the base, the housing having an end wall provided with a centrally located aperture, and rotatable means extending through the aperture and engageable with a cavity communicating with the top surface of the driver.

8. An electrical control comprising a housing provided with spaced apart front and rear walls, one of the walls being provided with an aperture, a driver having a bearing surface, the bearing surface being in frictional engagement with the inner surface of one of the walls of the housing, an annular ring of resilient material intermediate one of the walls of the housing and the driver for biasing the driver against the other wall of the housing, a contact assembly fixedly secured to the driver, means for making an electrical connection to the contact assembly, a resistance element disposed in the housing intermediate the walls thereof and electrically connected to a pair of terminals extending from the housing, a contact button mounted on the contact assembly and adapted for wiping the resistance element at any desired point intermediate the ends thereof, and means extending through the aperture and rotatable from the exterior of the housing for altering the relative position between the contact button and one end of the resistance element.

9. In a variable resistance unit, the combination of a supporting member provided with a supporting surface, an arcuate resistance means secured to the supporting surface, a cup-shaped driver supported by the supporting surface, a collector button centrally located and fixedly secured to the supporting member, a contact assembly fixedly secured within a cavity of the cup-shaped driver and including a contact button for wiping the resistance means at any desired point intermediate the ends thereof and a finger in electrical contact with the collector button, a hollow cylindrical housing provided with a centrally apertured closure wall at one end thereof and open at the other end thereof for receiving the cup-shaped driver and the supporting member, resilient means disposed between the inner surface of the closure wall of the housing and the cup-shaped driver for biasing the driver against the supporting surface, means for fixedly securing the supporting surface within the housing, and means operatively connected to the outer surface of the driver and engagable from the exterior of the housing for rotating the cup-shaped driver and the contact assembly through a predetermined angle.

10. In a variable resistance control, the combination of a housing provided with an apertured end wall, a supporting member mounted in one end of the housing in spaced relationship to the apertured end wall, a circumferential shoulder extending inwardly of the supporting member and integrally connected thereto, a driver disposed in the housing intermediate the end wall and the supporting member and having one end rotatably journaled on the circumferential shoulder, a detachably secured shaft journaled in the apertured end wall of the housing and rotatably supporting the other end of the driver, and means mounted to the driver for wiping a contact button intermediate the ends of a resistance element disposed in the housing, the means mounted to the driver being completely isolated from the end of the shaft.

11. In a variable resistance control, the combination of a housing provided with an apertured end wall, a supporting member mounted in one end of the housing in spaced relationship to the apertured end wall, a circumferential shoulder extending inwardly of the supporting member and integrally connected thereto, a driver disposed in the housing intermediate the end wall and the supporting member and having one end rotatably journaled on the circumferential shoulder, a shaft journaled in the apertured end wall of the housing and rotatably supporting the other end of the driver, a resistance element adhered to the supporting member and encircled by the circumferential shoulder, and a bifurcated contact assembly mounted to the driver and supporting a contact button for wiping the resistance element intermediate the ends thereof.

12. In a variable resistance unit, the combination of a hollow cylindrical housing closed at one end and open at the other end, a base member closing the open end of the housing, the housing being provided with a centrally located aperture, a resistance element disposed in the housing, a driver mounted in the housing, a contact assembly constrained to rotate with the driver, a shaft journaled in the centrally located aperture, a stop pin, and a lateral extension integral with the shaft defining a stop member engageable with the stop pin for limiting rotation of the shaft to an angle of less than 360°, a portion of the lateral extension and of the shaft being disposed in a mating cavity provided in the driver constraining the driver to rotate with the shaft.

13. A variable resistance unit comprising a hollow housing having an apertured closure wall and a depending flange to define a cover open at the bottom, a driver disposed in the housing, a supporting member received by the bottom opening of the housing, a resistance element secured to the inner surface of the supporting member, a contact assembly secured to the driver and rotatable therewith for wiping a contact button along the resistance element intermediate the ends thereof, a shaft extending through the aperture, a stop pin, and a lateral extension integral with the shaft defining a stop member engageable with the stop pin for limiting rotation of the shaft to an angle of less than 360°, the lower portion of the lateral extension and of the shaft being disposed in a mating cavity provided in the driver constraining the driver to rotate with the shaft.

References Cited by the Examiner
UNITED STATES PATENTS

| | | | |
|---|---|---|---|
| 1,672,123 | 6/1928 | Hartranft | 338—163 X |
| 2,358,991 | 9/1944 | Miller | 338—164 |
| 2,406,503 | 8/1946 | Miller | 338—164 |
| 2,576,044 | 11/1951 | Richman et al. | 338—184 X |
| 2,704,316 | 3/1955 | De Bell | 338—202 X |
| 2,789,191 | 4/1957 | Arisman et al. | 338—164 X |
| 2,839,642 | 6/1958 | Dickinson et al. | 338—174 X |
| 2,876,319 | 3/1959 | Held | 338—164 |
| 3,044,033 | 7/1962 | Mucher | 338—163 |
| 3,096,499 | 7/1963 | Hudson et al. | 338—174 X |

RICHARD M. WOOD, *Primary Examiner.*